United States Patent

Esmaeili

[11] Patent Number: 6,002,486
[45] Date of Patent: Dec. 14, 1999

[54] ILLUMINATION FOR IMAGING OPTICAL FIBER RIBBONS

[75] Inventor: Sasan Esmaeili, Solna, Sweden

[73] Assignee: Telefonaktiebolaget LM Ericsson, Stockholm, Sweden

[21] Appl. No.: 09/082,966

[22] Filed: May 22, 1998

[30] Foreign Application Priority Data

May 23, 1997 [SE] Sweden ................................ 9701952

[51] Int. Cl.$^6$ ............................ G01B 11/24; G01N 21/00
[52] U.S. Cl. ............................................ 356/376; 356/237
[58] Field of Search ...................... 356/376, 237, 356/428, 106; 362/16, 17, 138, 268

[56] References Cited

U.S. PATENT DOCUMENTS 4,863,275  9/1989  Cormack et al. ...................... 356/376

*Primary Examiner*—Frank G. Font
*Assistant Examiner*—Roy M. Punnoose
*Attorney, Agent, or Firm*—Burns, Doane, Swecker & Mathis, LLP

[57] ABSTRACT

When welding optical fibers retained to form a fiber ribbon the end portions of the fibers are imaged by a lens system on a surface comprising CCD-elements in a camera. Since two such pictures must be made in approximately perpendicular directions in order to determine the positions of the fiber ends, the optical axis when capturing such a picture must be located obliquely to a plane through the end portions of the fiber ribbons. The oblique position of the object in the picture results in that the magnification of the end portions of the fibers will be different for different fibers and thereby also the background illumination will be different and the contrast in a captured image will vary in the different portions of the picture, which show different fibers. In order to achieve a homogenous background illumination a light source is placed in the radiation path behind the end portions (of the object) as seen from the camera and between the light source and the object a diaphragm, which is designed as a non-circular aperture, for example having the shape of a semicircle or a symmetric trapezoid. In order to even more improve the background illumination a light scattering plate is arranged between the diaphragm and the object.

12 Claims, 2 Drawing Sheets

6,002,486

ILLUMINATION FOR IMAGING OPTICAL FIBER RIBBONS

The present invention relates to a method and a device for illuminating, when imaging the end region of a cut-off optical fiber ribbon, in particular in conjunction with splicing the fiber ribbon to another fiber ribbon by means of welding, the area intended to be imaged.

BACKGROUND

In order to measure, in a fiber ribbon welding device, various geometrical quantities such as fiber gap, fiber diameter, offset laterally between the exterior sides of the fibers and between the cores of the fibers, etc., of the fibers to be welded to each other the positions of the fibers in the xyz-coordinate system of the device must be determined. In order to make it the ends of the fibers must be observed in two different directions or equivalently two pictures must be taken in two such directions. These directions must then be placed obliquely in relation to a plane through the end portions of the fiber ribbons, most preferably in directions of about 45° to this plane, so that the two directions have an angle of about 90° to each other, in order to obtain the largest possible information on the positions of the fibers. In the imaging operation then thus the very object, i.e. the end portions of the fiber ribbons, is located obliquely, having some parts located more distant from and other parts at a shorter distance from the opening of a lens system which is included in the camera, by means of which such a picture is usually made. It causes in turn a varying magnification in the picture captured by the camera and thereby a varying light intensity in the picture. The varying light intensity in the picture is particularly embarrassing as to the generally used light background, which gives difficulties when measuring on all of the picture field and when adjusting the camera in order to obtain a maximal sensitivity in regard of the determination of the position of the outlines of the ends of the different fibers in relation to each other in one single picture.

Systems for achieving a more uniform incoming light intensity to different devices are known from for example U.S. Pat. Nos. 5,442,414 and 4,391,521 and from the published British patent application No. 2 226 145.

SUMMARY

It is an object of the invention to provide a method and a device which give a suitable background illumination of an object, which is imaged by means of an optical system, so that the light intensity in the picture in points outside the picture of the object is substantially constant.

It is another object of the invention to provide a method and a device for compensating non-constant magnification in an optical system and thereby a varying light intensity in a picture.

The problem which is solved by the invention is accordingly to provide a background illumination to be used in particular when imaging a more or less sparse object, i.e. which only covers a part of a taken picture and which has a substantially flat configuration or in any case the outlines of which are located substantially in a single plane, in which information is required on the position of the object in two directions perpendicular to each other, such as in vertical and horizontal directions, so that in particular the outlines of the object can be depicted sharply or so that the positions of the outlines in the pictures can be determined with a high accuracy.

When welding optical fiber ribbons in a fiber welding machine an object is imaged, which is constituted by the end portions of the fiber ribbons, by means of a lens system on a light sensitive surface. Since two such pictures must be captured in approximately perpendicular directions in order to determine the position of the object in all dimensions accurately, i.e. the position of the fiber ends for example both in a height direction and in their longitudinal direction, the optical axis in each picture must be located obliquely in relation to a plane passing through the outlines of the very object, i.e. through the end portions of the fiber ribbons. By the term that a position is oblique is here meant that it deviates substantially both from a parallel and a perpendicular position and thus also an oblique angle is an angle which deviates substantially from being equal to 0° or equal to 90°. The oblique position of the object in the imaging operation implies that the magnification of the end portions of the different fibers becomes different and thereby also the background illumination becomes different. The contrast in a picture captured of such an obliquely located object will then vary in the different portions of the picture, which show the ends of the different fibers which are included in the fiber ribbons. In order to produce a uniform background illumination a light source is placed, as seen from the lens system, behind the end portions, which form the object to be depicted. Between the light source and the object a diaphragm is arranged, which is asymmetric and is designed to have a non-circular aperture, in particular a non-rotationally symmetrical or a non-centrosymmetrical aperture, and which instead for example has the shape of a circular segment such as a semi-circle or a symmetric trapezoid. In order to further improve the background illumination a light diffusing plate can be placed between the diaphragm and the object.

Generally thus, a method and device is concerned with producing a background illumination when imaging an object having outlines located substantially in a single plane. The object is preferably end portions of optical fiber ribbons placed opposite each other in a fiber welding device. A light source provides, as seen in a direction, a light beam having substantially a uniform or homogenous intensity in this direction. The light beam thus comprises light rays which have substantially the same intensity and distributed substantially rotationally symmetrically around a centre direction. Such a light beam is easily produced by conducting light from a conventional light source through a straight channel or bore. The light source and the light beam are arranged, so that the centre direction of the light beam passes through and/or at the object and hits the backside or rear side of the object in an oblique angle, e.g. between 45 and 60°, in particular between 45 and 55°, in relation to a plane, which extends substantially through the outlines of the object. The light source is preferably placed, so that the centre direction extends substantially centrally through an opening of and/or in parallel to an optical axis of an imaging lens system.

Before hitting the object the intensity of the light beam is asymmetrically reduced in a particular way. The reduction is made so that less light rays hit the region of the object which is closest as seen in the light beam direction than more distantly located regions or so that, in the plane through the object, the intensity of light originating from the light source is smaller in the closest regions of the object plane than in distant regions, as counted from the light source.

The reduction of light intensity is suitably produced by some diaphragm, placed between the light source and the object. The diaphragm can then have an aperture, which has the shape of a segment of a circle such as a semi-circle or a symmetric trapezoid. In the case where the light beam is produced by conducting light in a channel having a circular uniform cross-section the reduction of intensity is preferably made by a diaphragm plate projecting in to the channel. Before hitting the object and after being reduced in intensity the light of the light beam can be scattered or diffused by suitable means, such as a light scattering or diffusing plate.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
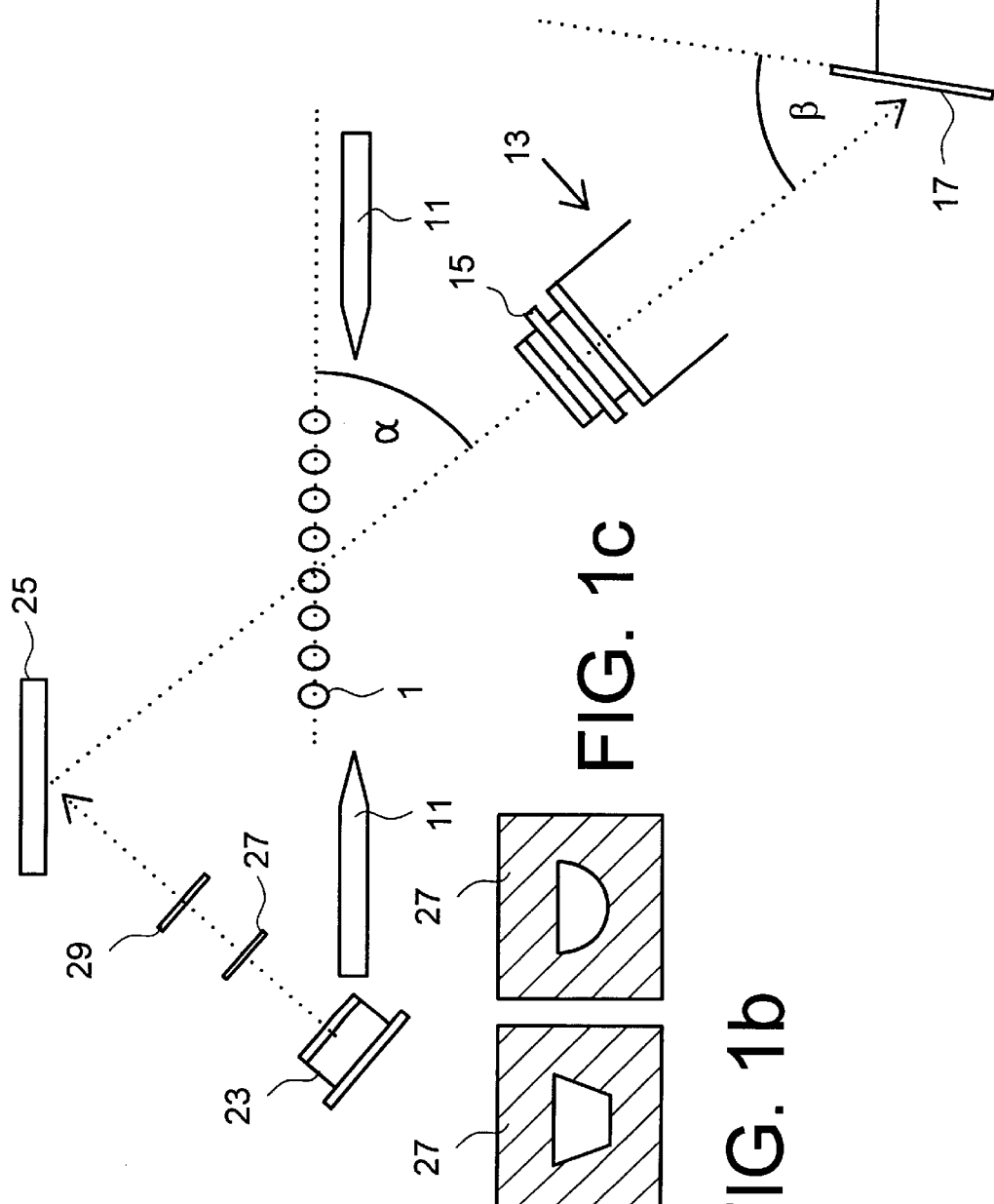
FIG. 1a is a schematic picture showing a fiber ribbon welding device comprising an optical system for imaging end regions of fiber ribbons inserted in the device.
FIG. 1b is a view of an aperture having a trapezoid shape.
FIG. 1c is a view of an aperture having a semi-circular shape.

In FIG. 1a a method of arranging a background illumination in a fiber splicing device is schematically illustrated. The fiber splicing device is intended for splicing optical fiber ribbons and comprises an optical system for imaging end portions of the fiber ribbons to be spliced, in order to display pictures thereof on a display monitor. The cross-sections of the individual optical fibers kept together to form a fiber ribbon are shown at 1, since the fibers are assumed to be located perpendicularly to the plane of the paper in FIG. 1a. In order to weld the fiber ends to each other electrodes 11 are arranged, which are connected to a high-voltage source, not shown, and which have longitudinal directions perpendicular to the fibers 1. When making the welding the end surfaces of the fibers are placed in a suitable way in relation to the points of the electrodes 11 and then between the points an electric arc is formed, which heats the end regions of the fibers and welds them to other fibers, not shown, also suitably kept together to form a fiber ribbon.

In order to determine the positions of the fibers and in particular the positions of their end surfaces and possibly other parameters of the fiber ends cameras are used, one of which being shown at 13 and which each comprise a lens system 15. The lens system 15 is arranged to have its optical axis located obliquely to the plane, which extends through the end regions of the fibers 1, so that the axis forms an acute angle α to this plane. When two cameras are used, they are symmetrically located in relation to the region, in which the welding is to be performed. In particular the optical axes of the two cameras can be assumed to be located in the same vertical plane as seen in FIG. 1a, perpendicularly to the longitudinal direction of the fiber ends. The axes should most preferably be located perpendicularly to each other in order to provide the largest possible information in regard of the positions of the fiber ends. This results in an angle α of 45°. It can be difficult to practically obtain such an angle in an actual welding device, in which a lot of further devices are provided, among other things devices providing a background illumination, as will be described hereinafter. However, an angle α of 45–60°, e.g. within the interval of 45–55°, generally gives sufficiently good information.

The camera 13 furthermore comprises light detectors 17 including a set of light sensitive elements, for example CCD-elements, arranged in a single plane. The light sensitive elements are connected to an electronic image processing unit 19 and therethrough to a display monitor 21, so that the picture captured can be displayed on the monitor. Since the end regions of the fibers 1 are not located perpendicularly to the optical axes of the cameras 13, the pictures of fiber ends produced by means of the lens systems 15 are not located in a plane perpendicular to the respective optical axis but they are located in a plane, which forms an angle β thereto. The plane of the pictures coincide with the plane of the light sensitive elements in the light detector 17, as is described in detail in the simultaneously filed patent application having the tide "Imaging optical fiber ribbons".

In the picture obtained by the optical system thus described the positions of the fiber ends appear from the positions of the outlines of the pictures of the individual fiber ends, which are determined by the image processing unit 19. The contours or outlines are formed by the contrast between the very picture of a fiber end and the picture of the light background. If a constant background illumination is used, the light intensity in the image plane at the light detector 17 is different in different regions of the picture, not considering the relatively small areas in the picture which are the direct pictures of the very fiber ends. The varying light intensity depends on the varying magnification in the different parts of the picture, which in turn results from the fact that the optical system comprises oblique object and image planes. The non-uniform background light intensity causes problems in measurements on the picture and in the automatic image processing in the unit 19. For example, the camera 13 is generally provided with a built-in automatic gain control, which automatically reduces the sensitivity of the light detector for a too large light intensity in some part of the picture. It can result in that the sensitivity is so much reduced that it for example in an automatic image processing becomes difficult to determine the boundary lines between a picture of the fiber end, at which the background light intensity is smallest. Also the picture of the end regions of the fibers, which is generated on a display monitor 21, obtains different light grades in its different parts, which makes it more difficult for an operator to evaluate this picture when directly looking at it.

In the welding device a background illumination is arranged by placing a light source 23 such as a light emitting diode generally in a direction straightly behind the fiber ends 1 as seen from the lens system 15 of the camera 13. In the case illustrated in FIG. 1a the light from the light source is deflected by a flat mirror 25 placed at a suitable location, for example having its mirror plane parallel to the plane through the fiber ends 1. In the path of the light rays from the light source 23 and the mirror 25 and thus between the light source and the objects which are to be imaged, i.e. the fiber ends 1, a diaphragm 27 is provided, which can for example comprise a flat, non-transparent plate having an opening therein. Between the diaphragm 27 and the mirror 25 a light scattering or diffusing plate 29 is provided having the shape of a suitable grating. The opening in the aperture 27 is then designed, for example having a suitable symmetrical trapezoid shape, as is indicated in FIG. 1b, so that the picture of the background illumination in the image plane through the light detector 17 has a substantially constant light intensity.

Figure 2:
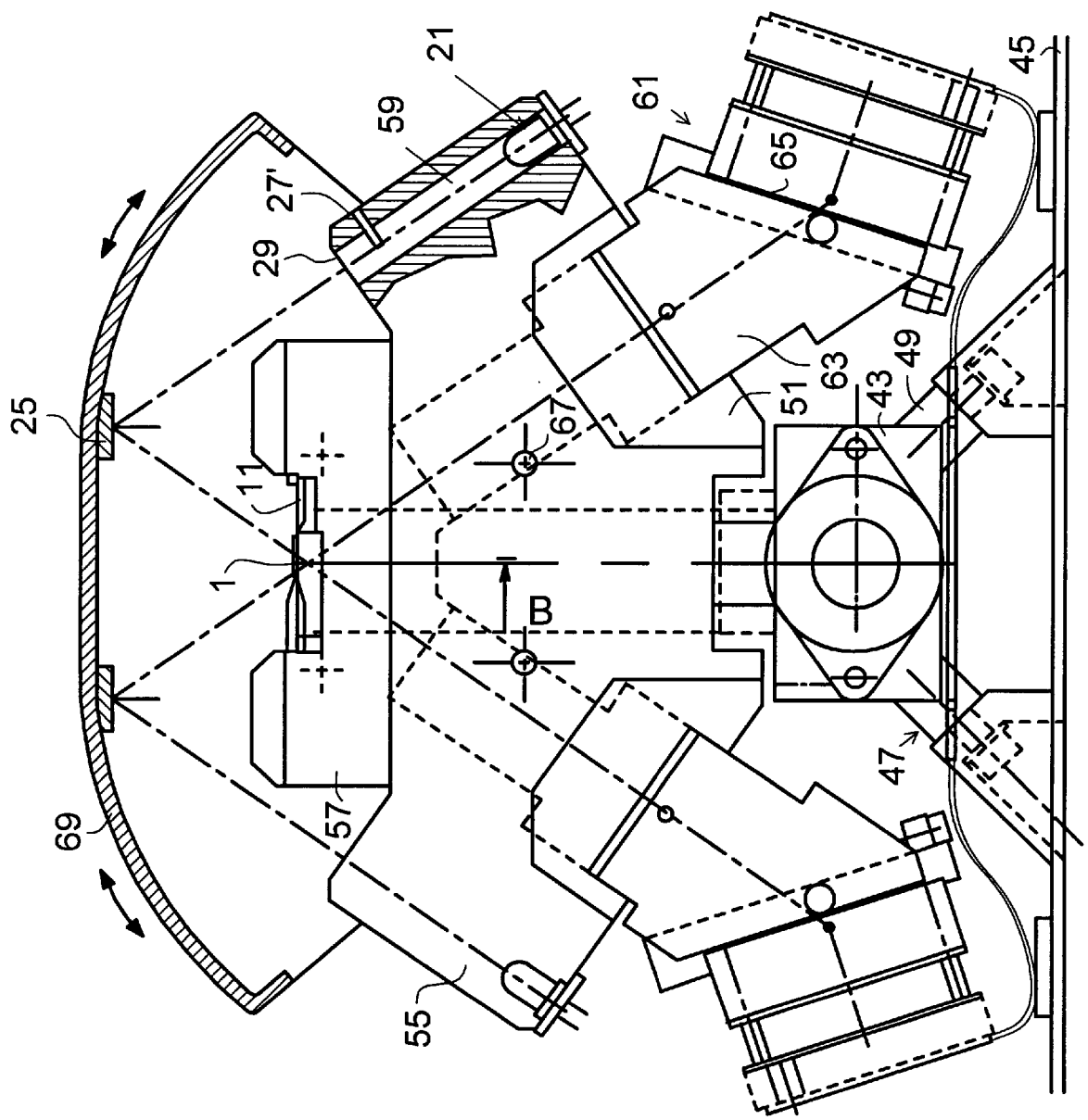
FIG. 2 is a side view of a fiber welding device as seen in the longitudinal direction of the fiber ribbons.

In FIG. 2 a detailed view, partly as seen in a sectional view, through a fiber welding device is shown, particularly intended for welding optical fiber ribbons, in which the view/the section is taken substantially centrally through the device and the view is seen in parallel to and the sectional views are taken perpendicularly to the direction of the fibers which are to be welded to each other. In this device the principle of background illumination is applied, which has being described above. The components of the device are carried by an elongated frame bar 43 having a longitudinal direction coinciding with the fiber direction and having a rectangular cross-section, which is supported by a base 45 through four oblique legs 47. The legs 47 can comprise elastic, cushioning intermediate pieces such as 49. Centrally on the frame bar 43 a central frame 51 is attached and projects therefrom. The central frame 51 has generally an isosceles triangular shape having its point between the two equal legs directed downwards towards the frame bar 43 and comprising a substantially horizontal and flat top surface and further comprising two symmetrically placed projections or triangular halves 55. They project perpendicularly to the direction of the fibers and are cut-off at their triangular points forming surfaces, which are located in straight angles to the oblique sides of the triangular shape. The projections 55 carry light sources and cameras, see hereinafter.

The horizontal top surface of the central frame 51 comprises an electrode house 57 to which parts, not shown, are attached, which are required for retaining the ends of the fibers and for the alignment thereof with each other, and further the welding electrodes 11. At the exterior sides of the projections 55 oblique cylindrical through-holes 59 are provided which extend in parallel to the exterior cut-off sides of the projections and the axes of which are located in a vertical transverse plane in which also the end surfaces of the fibers to be spliced to each other are located. The axes of the holes 59 and the exterior cut-off surfaces 55 are located in an angle between 30 and 45° in relation to a vertical plane, in the preferred case in an angle between 35 and 40° and preferably about 37°. In the holes 59 light passes from light sources 23 such as from light emitting diodes 21 mounted in the bottom ends of the holes.

Light from the light emitting diodes 21 passes in the circular cylindrical holes 59 towards the upper ends thereof but are first reduced in intensity by diaphragms, which together with the walls of the holes 59 are formed by plates 27', which perpendicularly project into the interior of the holes 59 and are arranged in slots in the central frame 51 at a distance from the upper openings thereof, which is approximately as large as the diameter of the holes 59. The diaphragm plates 27' have a straight inner or lower edge and projects in to about the centre of the holes 59, so that the light is allowed to pass through an approximately semi-circular aperture. The same resulting aperture is obtained, which is obtained by using a diaphragm 27 having a semi-circular aperture of the design illustrated in FIG. 1c. At the top openings of the holes 59 light scattering or diffusing means 29 are located such as suitable gratings in order to achieve a uniform, diffuse background illumination.

Camera units 61 are with their front portions inserted in corresponding holes in the oblique surfaces of the inverted triangular shape of the central frame 51. The camera units 61 have a front portion 63, which contains their optical system. The optical axes of the optical systems are parallel to the axes of the holes 59 and extend through the longitudinal axis of the fibers or fiber ribbons, which are to be spliced to each other exactly in the splicing plane. The continuations of the holes for the camera unit 61 extend up to the bottom side of the electrode housing 57 in order for light from the splicing region of the fibers being imaged by the optical systems on the light sensitive elements of the camera unit 61, the light sensitive elements being located at the plane 65 and arranged in an oblique angle and not perpendicularly to the axes of the optical systems, the angle being adapted to give a sharp picture of all different fibers in fiber ribbons, which are to be spliced.

The top portion of the central frame 51 and the electrode housing 57 is protected by two casing halves 69, which are mounted to be capable of swinging towards and from each other about shafts 67. At the interior side of the casings, at the topmost portions thereof including approximately horizontal surfaces the mirrors 25 are arranged having horizontal reflecting surfaces, which are placed, so that light rays from the diffusing elements 29 can be mirrored therein and reflected, so that they can enter the optical systems of the camera units 61 and be conducted thereby towards the light sensitive surfaces in the camera units.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of producing a background illumination when imaging an object having outlines located substantially in a single plane, comprising the steps of:

producing a light beam comprising light rays having substantially the same intensity distributed substantially rotationally symmetrically about a centre direction, arranging the centre direction, so that the centre direction hits a rear side of the object in an oblique angle of incidence in relation to a plane, which extends substantially through the outlines of the object, and reducing asymmetrically the intensity of the light beam before the light beam hits the object so that less light rays hit the most adjacent region of the object as seen in the direction of the light beam than more distant regions, whereby regions of the object, which are located closer to an imaging unit or an observer have a stronger background illumination than regions which are located more distantly.

2. The method of claim 1, wherein the oblique angle is between 45 and 60°.

3. The method of claim 1 comprising the additional step of scattering or diffusing the light beam after passing the diaphragm, in particular by making the light pass a light scattering or diffusing plate.

4. The method of claim 1, wherein the centre direction is arranged to hit an opening of an imaging lens system substantially centrally and/or parallel to an optical axis of the imaging lens system.

5. A device for producing a background illumination when imaging an object having outlines located substantially in a single plane, the device comprising:
- a light source, which provides a light beam comprising light rays having substantially the same intensity distributed substantially rotationally symmetrically around a centre direction,
- the light source being arranged, so that the centre direction passes through and/or at the object and hits the rear side of the object in an oblique angle in relation to a plane, which extends substantially through the outlines of the object, and
- a diaphragm placed between the light source and the object, for asymmetrically reducing the intensity of the light beam, so that less light rays hit the region of the object which is closest as seen in the light beam direction than more distantly located regions.

6. The device of claim 5, wherein the oblique angle is between 45 and 60°.

7. The device of claim 5, wherein the diaphragm has an aperture, which has a shape of a circular segment.

8. The device of claim 7, wherein the aperture has a shape of a semi-circle.

9. The device of claim 5 further comprising light scattering or diffusing means placed between the diaphragm and the object, in order to scatter of diffuse the light beam after passing the diaphragm.

10. The device of claim 5, wherein the light source is placed, so that the centre direction extends substantially centrally through an opening of and/or in parallel to an optical axis of an imaging lens system.

11. The method of claim 1, wherein the step of reducing asymmetrically includes using a diaphragm that is asymmetric and has a non-circular aperture.

12. The device of claim 5, wherein the diaphragm is asymmetric and has a non-circular aperture.

* * * * *